(12) United States Patent
Malik et al.

(10) Patent No.: US 7,179,761 B2
(45) Date of Patent: Feb. 20, 2007

(54) VAPOR BARRIER

(75) Inventors: Tariq M. Malik, Batavia, IL (US); James F. Dwyer, St. Charles, IL (US)

(73) Assignee: W.R. Meadows, Inc., Hampshire, IL (US)

( * ) Notice: Subject to any disclaimer, the term of this patent is extended or adjusted under 35 U.S.C. 154(b) by 11 days.

(21) Appl. No.: 10/729,467

(22) Filed: Dec. 6, 2003

(65) Prior Publication Data
US 2005/0124241 A1 Jun. 9, 2005

(51) Int. Cl.
*B32B 27/12* (2006.01)
*B32B 27/04* (2006.01)
*B32B 15/14* (2006.01)

(52) U.S. Cl. ............... 442/20; 442/31; 442/42; 442/43; 442/45; 442/48; 442/149; 442/180; 442/320

(58) Field of Classification Search .......... 442/20, 442/31, 42, 43, 45, 48, 180, 320, 149
See application file for complete search history.

(56) References Cited

U.S. PATENT DOCUMENTS

| 4,396,665 | A | * | 8/1983 | Rowe | 428/148 |
| 4,585,682 | A | * | 4/1986 | Colarusso et al. | 428/57 |
| 4,601,943 | A | * | 7/1986 | Haushofer et al. | 442/378 |
| 6,093,481 | A | * | 7/2000 | Lynn et al. | 428/217 |
| 2004/0097157 | A1 | * | 5/2004 | Cosentino | 442/394 |
| 2004/0161615 | A1 | * | 8/2004 | Cohen et al. | 428/432 |
| 2004/0261347 | A1 | * | 12/2004 | Hageman | 52/506.01 |

FOREIGN PATENT DOCUMENTS

| EP | 394117 A1 * | 10/1990 |
| GB | 1215137 * | 2/1967 |

* cited by examiner

*Primary Examiner*—Ula C. Ruddock
(74) *Attorney, Agent, or Firm*—Barnes & Thornburg LLP; Glenn W. Ohlson

(57) ABSTRACT

A bituminous water vapor retarder is disclosed of the type which can be used under concrete slabs in contact with soil or granular fill. The vapor barrier is a multi-ply weather coated permanently bonded semi-flexible bituminous core board composed of the homogeneous high melt point bituminous material in combination with an exclusive core suspended midpoint in the board. This core is sealed under heat and pressure between liners of asphalt and impregnated felt and a glass mat liner. An asphalt weather coat is applied to the glass mat liner and covered with a polyethylene anti-stick sheet.

12 Claims, 1 Drawing Sheet

VAPOR BARRIER

This disclosure relates to a vapor barrier and more specifically to a bituminous water vapor retarder of the type which can be used under concrete slabs in contact with soil or granular fill.

BACKGROUND

ASTM Specification E1993-98 is the standard specification for bituminous water vapor retarders used in contact with soil or granular fill under concrete slabs. That specification deals with a bituminous membrane water vapor retarder consisting of asphaltic materials reinforced with multiple plies of a suitable fabric. The property requirements of ASTM E1993-98 are with respect to water vapor permeance under certain conditions, tensile strength, and puncture resistance. A considerable amount of work has been undertaken in order to develop a membrane which will meet the requirements of ASTM E1993-98. This work has resulted in the development of the present disclosure which meets or exceeds that specification.

SUMMARY OF THE DISCLOSURE

In accordance with the disclosure, the bituminous water vapor retarder membrane has a multi-layer core comprising an aluminum sheet, laminated between a pair of thermoplastic sheets. The thermoplastic sheets are preferably polyester and the aluminum sheet is laminated to the polyester sheets with a low density polyethylene adhesive.

This laminated aluminum foil-polyester core is in turn laminated between a pair of fabrics at least one of which is impregnated with asphalt. It is preferred that one of the fabrics be an asphalt saturated felt and that the other fabric be a non woven fiberglass scrim which provides improved strength to the membrane. The asphalt saturated felt fabric layer is adhesively secured to the core by an asphalt coating and it has been found that superior results in the adhesion of the asphalt coating to the core are achieved if the core itself has an acrylic coating.

In like manner, the fiberglass scrim is adhesively secured to the core by means of an asphalt coating, with the surface of the polyester sheets adjacent the asphalt coating being covered with an adhesion promoter, preferably in the form of an acrylic coating. It is preferred that the acrylic coating on the outer surfaces of the polyester core sheets be selected from the group consisting of a methacrylic acid ester, or glycidyl acrylate, or methalacrylate or a copolymer of acrylonitrile and styrene. Although an acrylic coating is the preferred adhesion promoter, as an alternative adhesion could be promoted by treating the outside surface of each polyester film by a well-known plasma or corona surface treatment in order to facilitate adhesion of the asphalt coating to the core. A number of other well known adhesion promoters may also be used.

The polyester sheet is preferably a polyethylene terapthalate (PET).

Thus, the migration of water vapor from an underlying support surface such as the ground or gravel to an overlying porous slab such as a concrete slab, can be substantially inhibited by a method which comprises placing a multi-layer bituminous membrane on the supporting surface, the bituminous membrane comprising an aluminum sheet laminated between a pair of polyester sheets to form a multi-layer core with the core being laminated to at least one fabric sheet impregnated with asphalt, and placing the concrete slab on top of the bituminous membrane.

DETAILED DESCRIPTION

Figure 1:
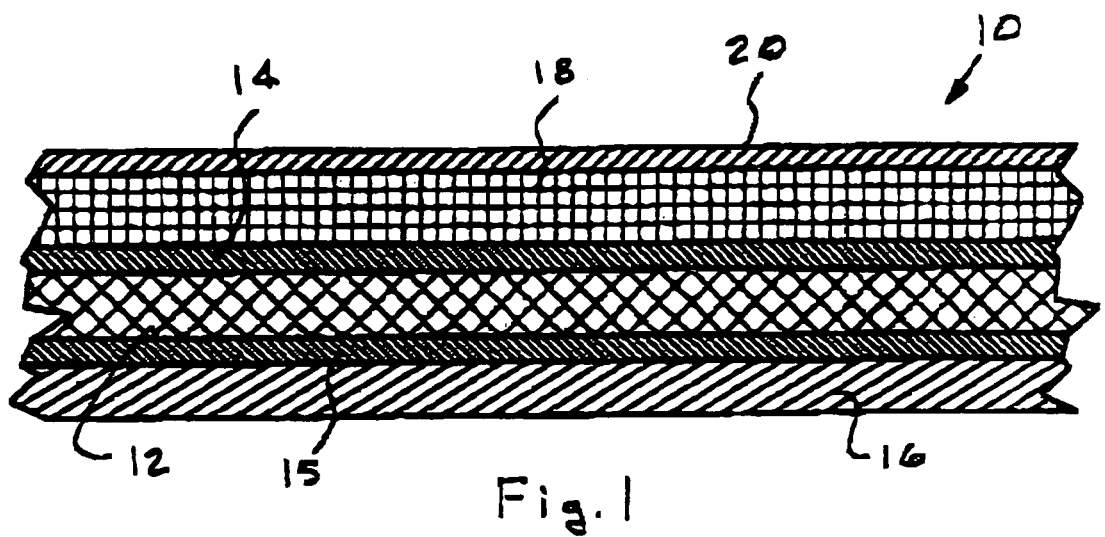
FIG. 1 is an enlarged cross sectional view of a vapor barrier constructed in accordance with the disclosure showing core sandwiched between a pair of fabric sheets.

The vapor retarder of this disclosure is a semi-flexible bituminous core board 10. FIG. 1 is an enlarged cross section of this board. The board 10 consists of a unique core 12 which has an asphalt coating 14 and 15 on either side. The asphalt coating 14 on one side bonds the core 12 to an asphalt saturated felt fabric sheet 16. On the other side the asphalt coating 15 bonds the core 12 to a fiberglass fabric or scrim 18. On the top of the fiberglass scrim it is preferred that there be a 1-mil polyethylene sheet 20 primarily for purposes of preventing the boards from sticking to one another when they are stacked one on top of the other.

Figure 2:
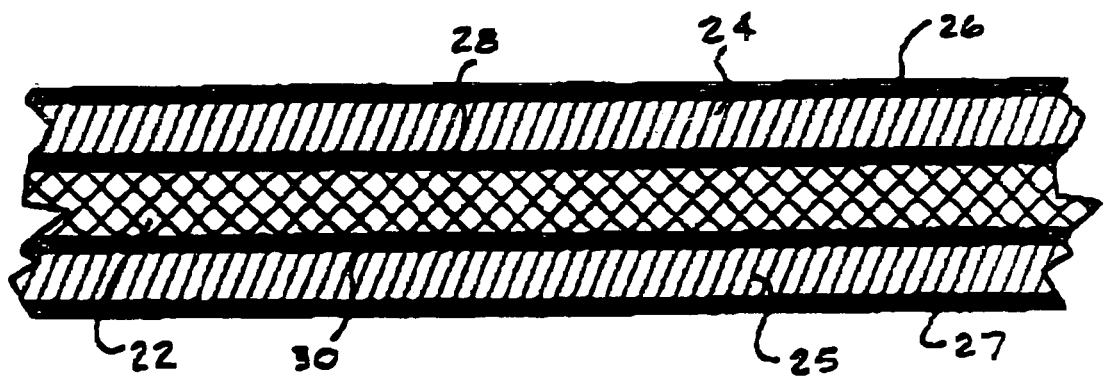
FIG. 2 is a further enlarged cross sectional view of the multi-layer core of the vapor barrier of FIG. 1.

In FIG. 2 there is shown an enlarged cross sectional view of the core 12 of the vapor barrier board 10. In the center of this core is an aluminum foil sheet 22 which preferably has a minimum thickness of 0.00028 inches. This aluminum sheet 22 is laminated between a pair of polyester sheets 24 and 25 which have been chemically or physically surface treated, and to the outside of each polyester sheet 24 and 25 is bonded acrylic coatings 26 and 27 respectively. The acrylic coatings 26 and 27 are in turn in contact with and bonded to the asphalt coatings 14 and 15 respectively which in turn bond the core to the asphalt saturated felt fabric sheet 16 on one side and the fiberglass scrim 18 on the other. The acrylic coating on the polyester sheets 24 and 25 helps to create a strong bond between the polyester sheets 24 and 25 and the asphalt coatings 14 and 15. The strong bond between either polyester sheet 24 or 25 and asphalt coating 14 or 15 resists delamination due to the cold temperature and a sudden impact during transportation.

While the aluminum foil sheet 22 may be between 0.0001 to 0.0025 inches, it is preferred that the thickness be on the order of 0.00028 minimum. An aluminum foil sheet by itself in an underlayment would exhibit the desired perm ratings and other properties, but under certain conditions, it might exhibit corrosion and delamination. It has been found that such corrosion is reduced or eliminated by laminating the aluminum foil sheet between the polyester sheets in the manner herein described. The best adhesion between the aluminum foil sheet 22 and the two polyester sheets 24 and 25 is achieved by means of a coating of a low density polyethylene adhesive 28 and 30.

It is preferred that the polyester sheets 24 and 25 be a polyethylene terapthalate (PET). Applied to the outer surfaces of the polyester core sheets are acrylic coatings 26 and 27. These acrylic coatings 26 and 27 act as chemical adhesion promoters for promoting adhesion between the outer surfaces of the polyester core sheets 24 and 25 and asphalt layers 14 and 15 which secure the core to the overlying fabric sheets 16 and 18 and are preferred to other well known adhesion promoters. The acrylic coatings are preferably selected from the group consisting of a cross linked copolymer of methacrylic acid ester and glycidyl acrylate, or methacrylate, or a copolymer of acrylonitrile and styrene. Adhesion may also be promoted by means of a physical surface treatment of the polyester film. This can, for example, be satisfactorily done by means of a corona treatment in which a high frequency voltage is applied to the surface of the sheet, which results in a change in the chemistry of the surface of the polyester, enhancing the bonding to the asphalt coating. In the plasma surface treatment, reactive gas molecules are defused toward the surface of the polyester under the influence of electric and/or magnetic fields, and again the chemistry of the substrate surface is changed to impart the desired functionality.

The felt sheet 16 may be of organic or inorganic material and different gauges of felt may be used depending upon the desired thickness, strength and flexability of the final product. The felt is impregnated with asphalt. The asphalt could be soft, hard or a mixture of the two. The vapor barrier also includes a glass fiber scrim 18 and different gauges of glass fiber scrim may be used. The layers of asphalt 14 and 15 in the vapor barrier bind the core 12 to the fiberglass scrim 18 on one side and to the asphalt saturated felt 16 on the other. The asphalt in these layers 14 and 15 is preferably type III asphalt which is a petroleum based homogeneous high melt point bituminous material meeting ASTM D 132 specifications. The felt in the preferred embodiment is a virgin wood paper and recycled corrugated paper. The glass fiber scrim 18 is preferably a white glass non-woven sheet of fiberglass fibers which are bonded together by formaldehyde binder. It is uniformly smooth and free from delamination, wrinkles, voids and the like.

The coating asphalt in molten form is added to the saturated felt using a conventional manufacturing process. The coating is spread to achieve the desired uniform thickness. Next, the core 12 is laminated under heat and pressure between a layer of asphalt and the saturated felt 16 on one side and a layer of asphalt and the saturated glass fiber scrim 18. Then a 1-ml polyethylene sheet 20 is applied to the surface of the glass fiber scrim. The vapor barrier is then cooled, cut and trimmed to proper length and width. The polyethylene sheet 20 serves as an anti-stick sheet to prevent the boards from sticking to one another when they are stacked one on top of the other.

The vapor barrier constructed in accordance with the foregoing offers a virtually impermeable vapor proofing system with a perm rating of less than 0.002 perms, and it is used primarily for horizontal applications providing excellent tensile strength and puncture resistance. It helps to prevent warping, buckling or delamination of subsequent floor systems reducing fungus, mildew and mold as well as helping to prevent radon gas from entering the structure. The vapor retarder can be used under concrete slabs in contact with soil or granular fill and it helps to maintain the maximum slab moisture transfer rate to no more than 3 pounds per 1,000 square feet per twenty four hours, the amount allowed by the flooring industry's specifications.

Although the disclosed vapor barrier has been described with particularity, it will be readily apparent to those skilled in the art that many modifications can be made without departing from the spirit and broad scope of the disclosure.

What is claimed is:

1. A bituminous water vapor retarder membrane having a multi-layer core comprising an aluminum sheet laminated between a pair of thermoplastic sheets, wherein the aluminum sheet and the thermoplastic sheets are laminated together with a low density polyethylene, said core being laminated to at least one fabric sheet impregnated with asphalt wherein the membrane is used underground.

2. The membrane of claim 1 wherein the said core is laminated between a pair of fabrics at least one of which is impregnated with asphalt.

3. The membrane of claim 2 wherein one of the fabrics is asphalt saturated felt.

4. The membrane of claim 2 wherein the other fabric of the pair of fabrics is a fiberglass scrim.

5. The membrane of claim 4 wherein the fiberglass scrim is impregnated with asphalt.

6. The membrane of claim 1 wherein a coating of asphalt is used to adhesively secure said core to said one fabric.

7. A bituminous water vapor retarder membrane having a multi-layer core comprising an aluminum sheet laminated between a pair of polyester sheets, said core to at least one fabric sheet impregnated with asphalt wherein the membrane is used underground wherein said polyester sheets are a polyethylene terapthalate.

8. The membrane of claim 6 wherein each outer surface of the core is treated with an adhesion promoter and is adhesively secured to said fabric by asphalt.

9. The membrane of claim 8 wherein the adhesion promoter comprises a coating selected from the group of an acrylic coating, cross linked copolymers of methacrylic acid ester and glycidyl acrylate, methacrylate, and a copolymer of acrylonitrile and styrene.

10. The membrane of claim 8 wherein the adhesion promoter is a physical plasma or corona surface treatment.

11. A bituminous water vapor retarder membrane having a multi-layer core comprising an aluminum sheet laminated between a pair of polyester sheets, said core being laminated to at least one fabric sheet impregnated with asphalt wherein the membrane is used underground, and wherein said polyester sheets are treated with an adhesion promoter.

12. In a multi-layer vapor retarder having a pair of fabric sheets at least one of which is impregnated with asphalt, a core sandwiched between and adhesively secured to said fabric sheets, said core comprising an aluminum foil sheet adhesively secured between a pair of polyester sheets and secured thereto by means of a low density polyethylene adhesive, said sheets having an acrylic coating on their exterior surfaces.

* * * * *